(12) United States Patent
Burnett et al.

(10) Patent No.: US 7,963,039 B2
(45) Date of Patent: Jun. 21, 2011

(54) METHOD OF CONSTRUCTING A MANDREL FOR FABRICATION OF A MONOLITHIC NACELLE COMPOSITE PANEL

(75) Inventors: John L. Burnett, Derby, KS (US); David W. Hackler, Wichita, KS (US); Timothy C. Wilson, Augusta, KS (US); John M. Welch, Wichita, KS (US); Thomas D. Popp, Wichita, KS (US); Christopher S. Sawyer, Oxford, KS (US); Leo B. Hoadley, Belle Plaine, KS (US); Leroy J. Fulbright, Wichita, KS (US); Mitchel B. Granger, Wichita, KS (US); Barry B. Craig, Rose Hill, KS (US); Phillip E. Kenney, Cottonwood Falls, KS (US)

(73) Assignee: The Boeing Company, Chicago, IL (US)

( * ) Notice: Subject to any disclaimer, the term of this patent is extended or adjusted under 35 U.S.C. 154(b) by 101 days.

(21) Appl. No.: 12/400,003

(22) Filed: Mar. 9, 2009

(65) Prior Publication Data

US 2009/0172936 A1  Jul. 9, 2009

Related U.S. Application Data

(62) Division of application No. 10/907,320, filed on Mar. 29, 2005, now Pat. No. 7,571,527.

(51) Int. Cl.
*B21K 23/00* (2006.01)
*B25B 27/14* (2006.01)
*B23Q 3/00* (2006.01)

(52) U.S. Cl. ........... 29/897.32; 29/464; 29/468; 60/798; 244/110 B

(58) Field of Classification Search ............ 29/445, 29/448, 558, 469, 23.51, 897.32; 60/798, 60/226.2; 244/110 B
See application file for complete search history.

(56) References Cited

U.S. PATENT DOCUMENTS

| 3,600,023 A |   | 8/1971 | Gudde |
|---|---|---|---|
| 3,762,667 A |   | 10/1973 | Pender |
| 3,800,402 A | * | 4/1974 | Bailiff ............................ 29/445 |
| 4,044,973 A |   | 8/1977 | Moorehead |
| 4,283,028 A |   | 8/1981 | Wilke |
| 4,286,727 A |   | 9/1981 | Limoncelli |

(Continued)

FOREIGN PATENT DOCUMENTS

EP    0926333    6/1999

(Continued)

*Primary Examiner* — Sarang Afzali
(74) *Attorney, Agent, or Firm* — Ostrager Chong Flaherty & Broitman P.C.

(57) ABSTRACT

A method of constructing, assembling and disassembling a mandrel for fabricating a monolithic composite nacelle panel for use on an airplane comprises attaching a first fairing bar including an exposed ball roller assembly to a tilting plate; attaching a first outer section to said first fairing bar; attaching a second outer section to said first fairing bar; attaching a center section to said first outer section and said second outer section; attaching a nozzle section to said first fairing bar and positioned adjacent an inner wall of said first outer section, an inner wall of said center section, and an inner wall of said second outer section; attaching a second fairing bar to said first outer section, said center section, and said second outer section; and attaching a cavity section to said second fairing bar.

17 Claims, 10 Drawing Sheets

U.S. PATENT DOCUMENTS

| | | | |
|---|---|---|---|
| 4,365,775 A | 12/1982 | Glancy | |
| 4,549,708 A | 10/1985 | Norris | |
| 4,557,441 A | 12/1985 | Aspinall | |
| 4,585,189 A | 4/1986 | Buxton | |
| 4,629,146 A | 12/1986 | Lymons | |
| 4,679,750 A | 7/1987 | Burhans | |
| 4,683,717 A | 8/1987 | Naud | |
| 5,076,514 A | 12/1991 | Melcher | |
| 5,083,426 A | 1/1992 | Layland | |
| 5,112,242 A | 5/1992 | Choy | |
| 5,239,822 A | 8/1993 | Buchacher | |
| 5,307,623 A | 5/1994 | Antuna | |
| 5,369,954 A | 12/1994 | Stuart | |
| 5,706,651 A | 1/1998 | Lillibridge | |
| 5,791,138 A | 8/1998 | Lillibridge | |
| 5,794,434 A | 8/1998 | Szupkay | |
| 5,819,528 A | 10/1998 | Masson | |
| 5,855,051 A * | 1/1999 | Lindenthal | 29/415 |
| 5,904,041 A | 5/1999 | Dhainault | |
| 5,915,765 A | 6/1999 | Sternberger | |
| 5,943,856 A | 8/1999 | Lillibridge | |
| 6,032,901 A | 3/2000 | Carimalie | |
| 6,036,238 A | 3/2000 | Lallament | |
| 6,059,231 A | 5/2000 | Dessenberger | |
| 6,065,285 A | 5/2000 | Gonidec et al. | |
| 6,151,886 A | 11/2000 | Vauchel | |
| 6,173,807 B1 | 1/2001 | Welch et al. | |
| 6,189,832 B1 | 2/2001 | Jackson | |
| 6,220,546 B1 | 4/2001 | Klamka et al. | |
| 6,227,485 B1 | 5/2001 | Porte | |
| 6,293,495 B1 | 9/2001 | Aten et al. | |
| 6,340,135 B1 | 1/2002 | Barton | |
| 6,517,027 B1 | 2/2003 | Abruzzese | |
| 6,568,172 B2 | 5/2003 | Jannetta et al. | |
| 6,678,932 B1 * | 1/2004 | Duval et al. | 29/281.1 |
| 6,895,742 B2 | 5/2005 | Lair et al. | |
| 6,945,031 B2 | 9/2005 | Lair et al. | |
| 7,571,527 B2 * | 8/2009 | Burnett et al. | 29/281.6 |
| 2004/0068978 A1 | 4/2004 | Lair et al. | |

FOREIGN PATENT DOCUMENTS

FR 2711187 4/1995

* cited by examiner

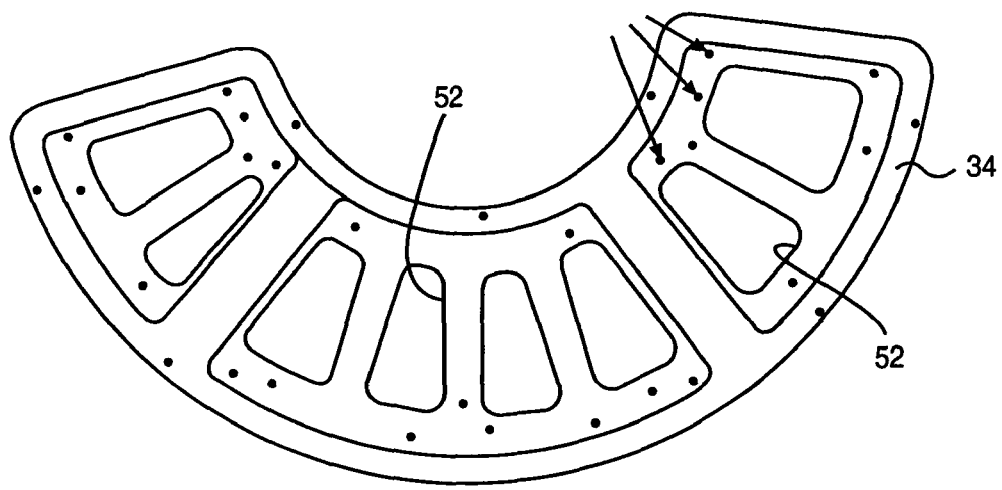
FIG. 3
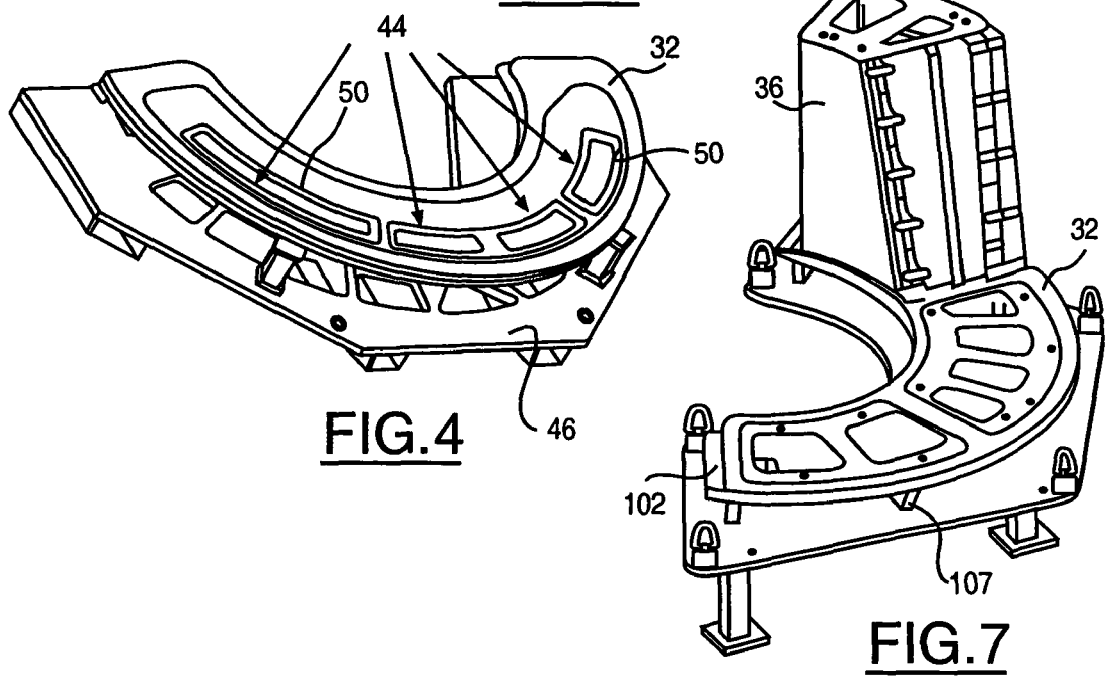
FIG. 4
FIG. 7
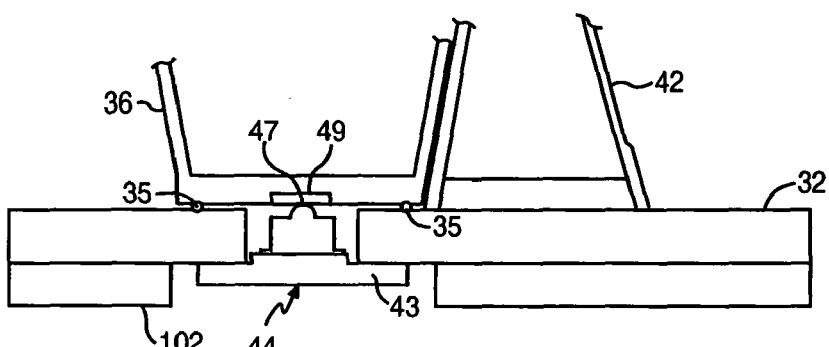
FIG. 5

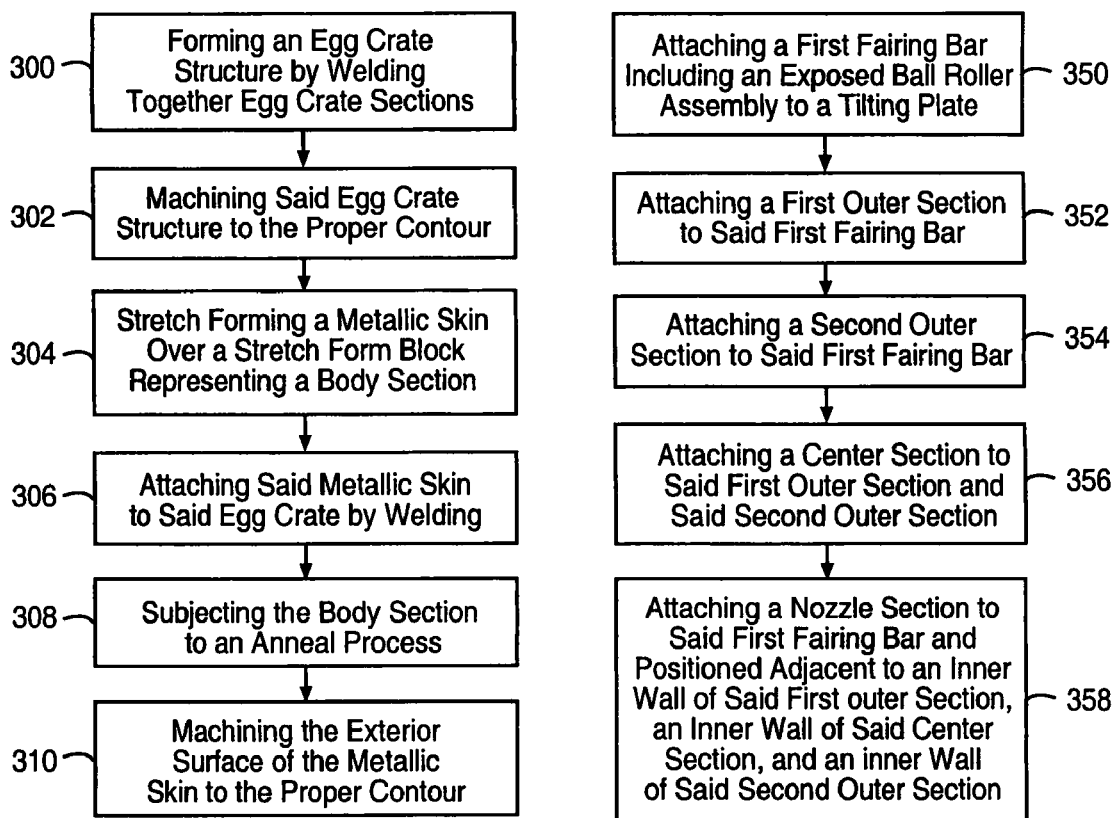
FIG.16
FIG.17
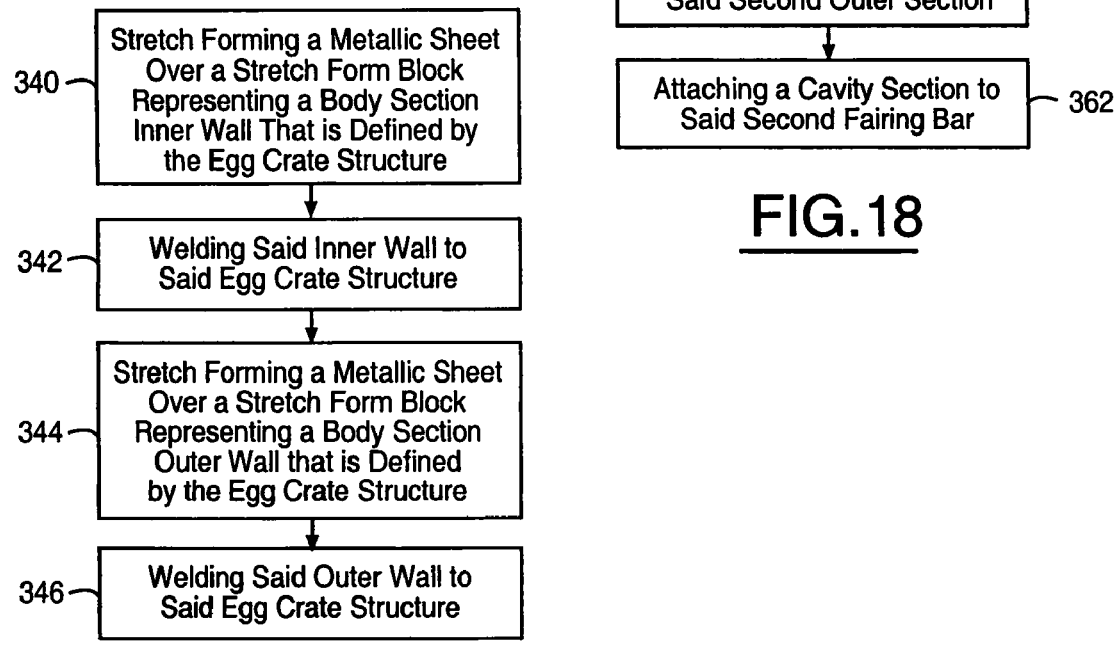
FIG.18

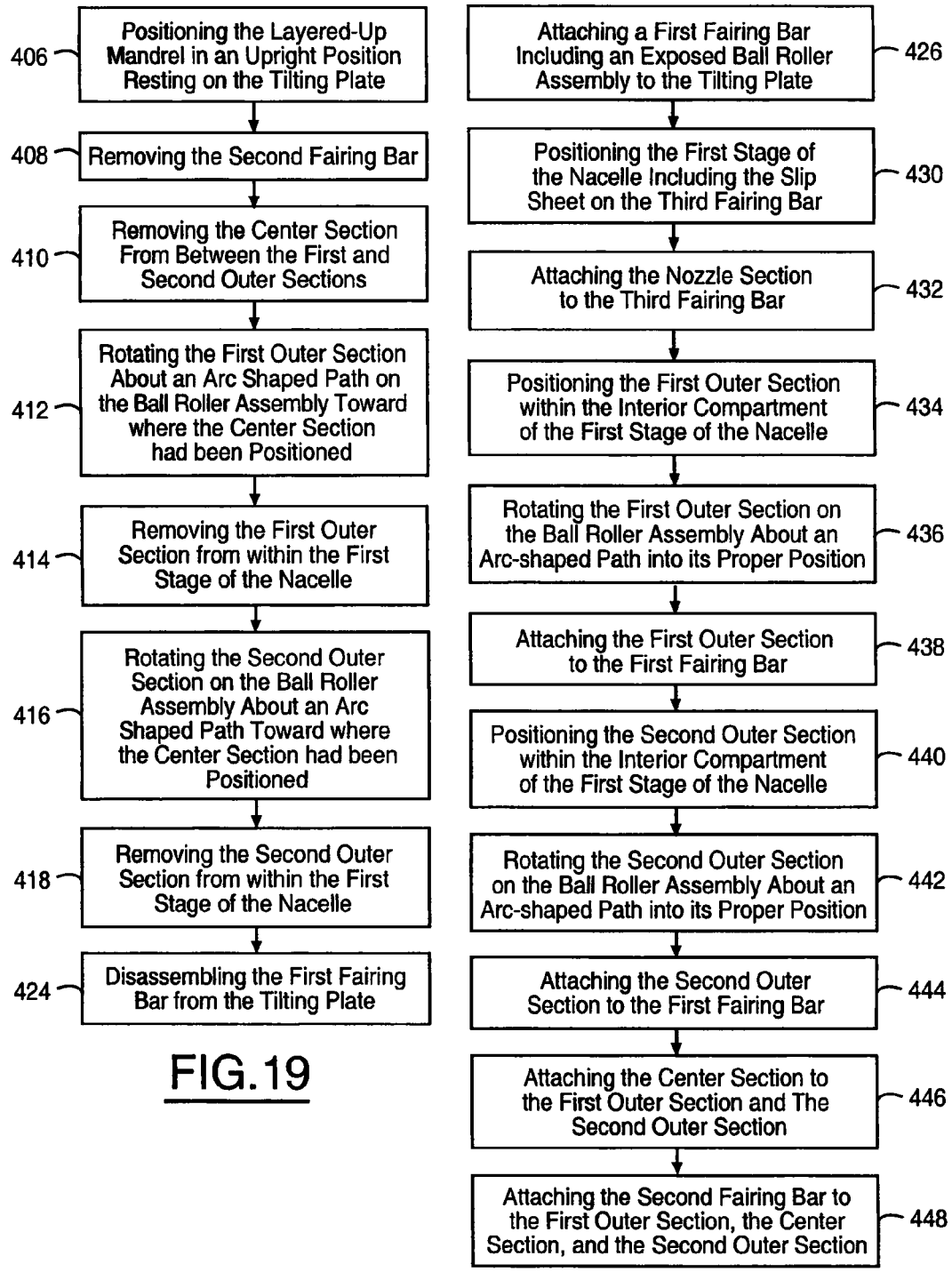

METHOD OF CONSTRUCTING A MANDREL FOR FABRICATION OF A MONOLITHIC NACELLE COMPOSITE PANEL

RELATED APPLICATION

This application is a divisional utility patent application of, and claims priority from, prior Ser. No. 10/907,320, filed Mar. 29, 2005 now U.S. Pat. No. 7,571,527. The disclosure of the prior application is incorporated herein in its entirety.

TECHNICAL FIELD

This application relates generally to fan duct tooling to fabricate composite fan duct panels for a nacelle or thrust reverser application, and more particularly to a tool for forming a composite monolithic fan duct panel, the features that are necessary for a tool of that configuration, and a method of making that tool.

BACKGROUND

The nacelle and thrust reverser panels used on commercial airplane applications are derived from a series of lofted surfaces to manage air as it flows around, and is passed through high by-pass turbofan engines. Of primary interest are the fan duct contours, that for purposes of this application can be described as the inner fan duct surface and the outer fan duct surface. These two opposing surfaces are faced with an upper and lower surface that are also lofted but could be represented by a near vertical intersecting plane. These four surfaces create the fan-duct cavity which could be simplistically described in a shape that are two half circles, one larger than the other, with their ends connected with two vertical lines.

Presently it is known to fabricate fan duct panels by individually forming the required sides of the fan duct that correlate to the individually lofted surfaces, each surface requiring an individual tool, and then subsequently attaching them together via rivets, to form a completed fan duct geometry. There are a number of disadvantages inherent in known methods of fabricating fan duct panels requiring tools discretely allocated to each lofted surface. One disadvantage is that there are multiple tools allocated to each lofted surface, which require multiple cure stages during part fabrication that contribute to increased expense and flow-time of the process. Since multiple tooling is required for each specific lofted surface, another disadvantage is the significant weight of the fan duct tooling.

The known tools, due to their significant weight, are bulky and require substantial capital equipment to move them around. The inherent weight of the known tooling also causes great concern for deflection during handling. Since the lofted contours that the tools are supposed to replicate have to be kept to extremely tight tolerances, the tools have to be designed for deflections using open sections that are extremely structurally inefficient. The result is that even more weight is added to compensate for tool deflection issues. An additional disadvantage relating to the deflection issue is that the known tooling has to lie flat on the floor and workers are unable to stand while performing part fabrication. Therefore, workers are required to bend and to climb over them. The result of this is worker exhaustion and attrition. Yet another disadvantage of this type of tool configuration in the state of the art is the significant waste of the composite materials used to form the part due to tool excess surface requirements, which accommodate the vacuum bag for part cure. Finally, other disadvantages include the great expense associated with the tool fabrication of the known tooling, the fabrication of individual fairing bars for the known tooling which can constitute a substantial number of individual components, and the individual time and labor to place and remove these fairing bars on the tool during part fabrication.

SUMMARY

The apparatus and method disclosed herein overcomes the disadvantages of known fan duct tooling and known methods of forming individual fan duct tooling associated with each individual compound contour lofted surface. The mandrel disclosed herein combines the inner and outer lofted surfaces of the fan duct cavity to create one tool where as many as four tools had been used before in the known art. This feature reduces tool count as well as multiple cure cycles.

Additionally, the mandrel features the ability to be removed from a unique fan duct part in such a manner so as to allow the part to remain in one continuous piece. A multiple piece mandrel or tool is provided in which the pieces are located accurately relative to one another and yet are still easily separated. These multiple piece mandrel elements are closed sections having extremely efficient structural rigidity, which allows them to be fabricated from less expensive tooling materials, such as aluminum.

The nature of these closed sections as multi-piece elements, also results in much less deflection than prior art fan duct tooling. Consequently, the fan duct tool is very lightweight in comparison to fan duct tooling in the known art. The ability to use aluminum in this application adds a further advantage to capture the effect of thermal growth of the tool relative to part materials. This feature aids in the steps for de-molding this type of tool when a continuous fan duct part is fabricated on the mandrel.

Still additionally, the apparatus disclosed herein, due to its innate resistance to deflection and its lighter weight, can be located in a variety of positions without compromising lofted surface integrity due to deflection. For example, the apparatus may be located vertically, instead of horizontally, and workers can freely move around the tool without bending over, or crawling out onto the tool. The apparatus uses two large, closure type fairing bars that aid in the deflection resistance, reduce the amount of tooling excess, and function as a bagging location to allow the vacuum bag to span the entire part and have a consistent location. The amount of waste then, in excess bagging materials, excess manufacturing materials, and labor associated with creating both, is drastically reduced. Since there are only the two fairing bars, the procedure for replacement and removal is simplified dramatically from the multiple fairing bars on prior art tooling.

Additionally, fairing bar placement and removal can now be performed using automated equipment, instead of manual labor, thus reducing or eliminating exhaustion and attrition. Finally, the multi-piece tool disclosed herein accommodates fabrication of a variety of fan duct nacelle configurations, including a continuous, monolithic fan duct in the preferred embodiment.

BRIEF DESCRIPTION OF THE DRAWINGS

The apparatus and method will be described by way of example with reference to the following drawings:

FIG. 3 illustrates a bottom view of the second fairing bar.

FIG. 4 illustrates the first fairing bar including the ball roller assembly attached to the tilting plate.

FIG. 5 illustrates the ball roller assembly.

FIG. 7 illustrates the attachment of the first outer section to the first fairing bar.

FIG. 16 illustrates the method of assembling a body section of the mandrel.

FIG. 17 illustrates the method of stretch forming a metallic skin over Stretch Form Blocks representing the egg crate structure.

FIG. 18 illustrates the method of assembling a mandrel for fabrication of a monolithic composite nacelle.

FIG. 19 illustrates the method of disassembling the first mandrel.

FIG. 20 illustrates the method of assembling the second mandrel.

DETAILED DESCRIPTION OF THE PREFERRED EMBODIMENT

Figure 1:
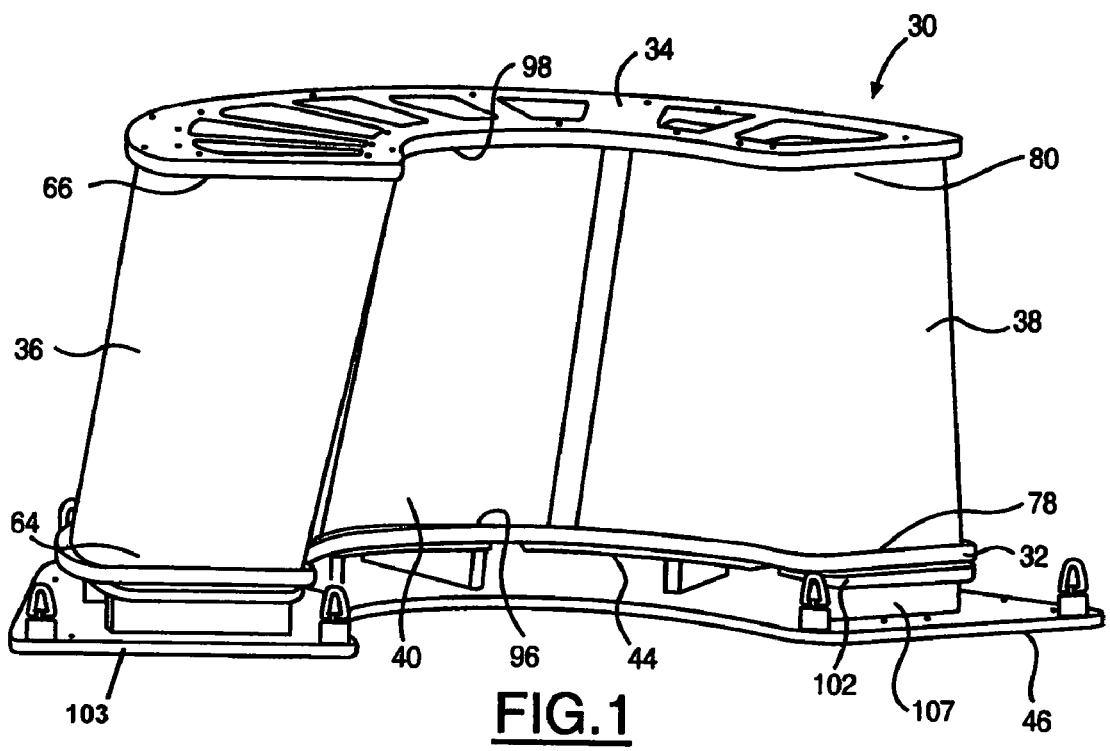
FIG. 1 illustrates a perspective view of the mandrel.
Figure 2:
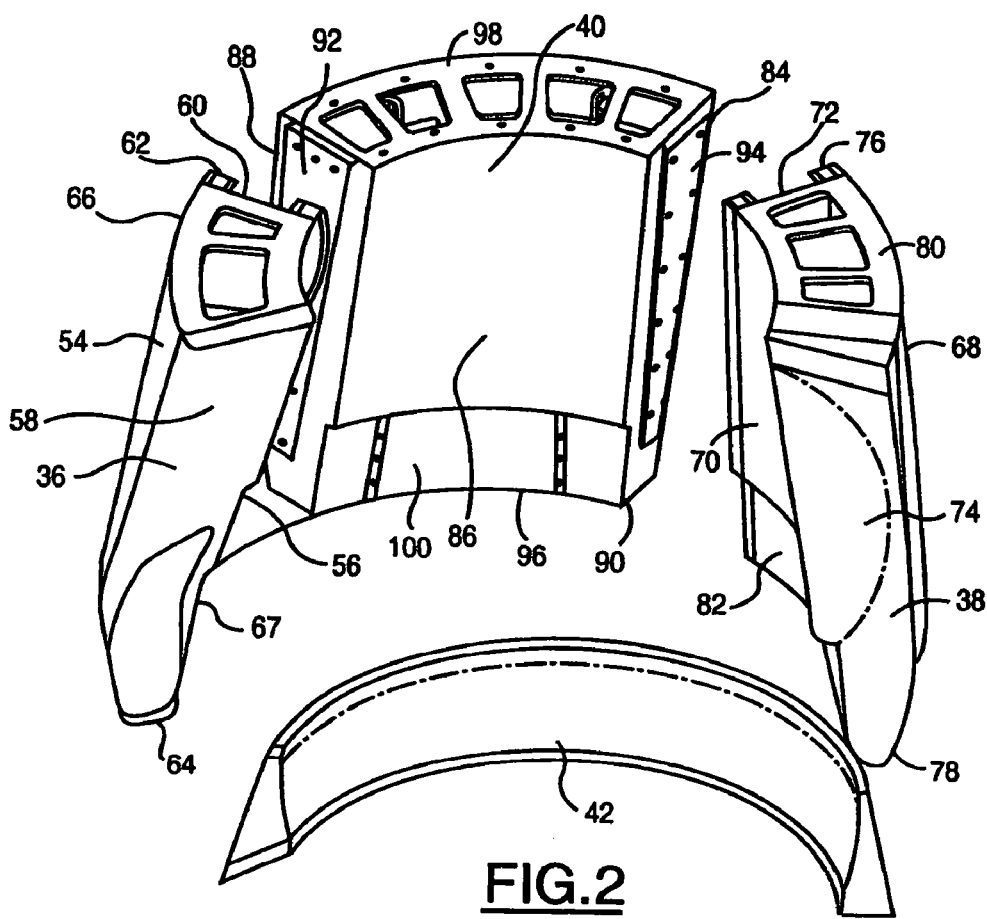
FIG. 2 illustrates an exploded perspective view of the body sections and nozzle section.
Figure 6:
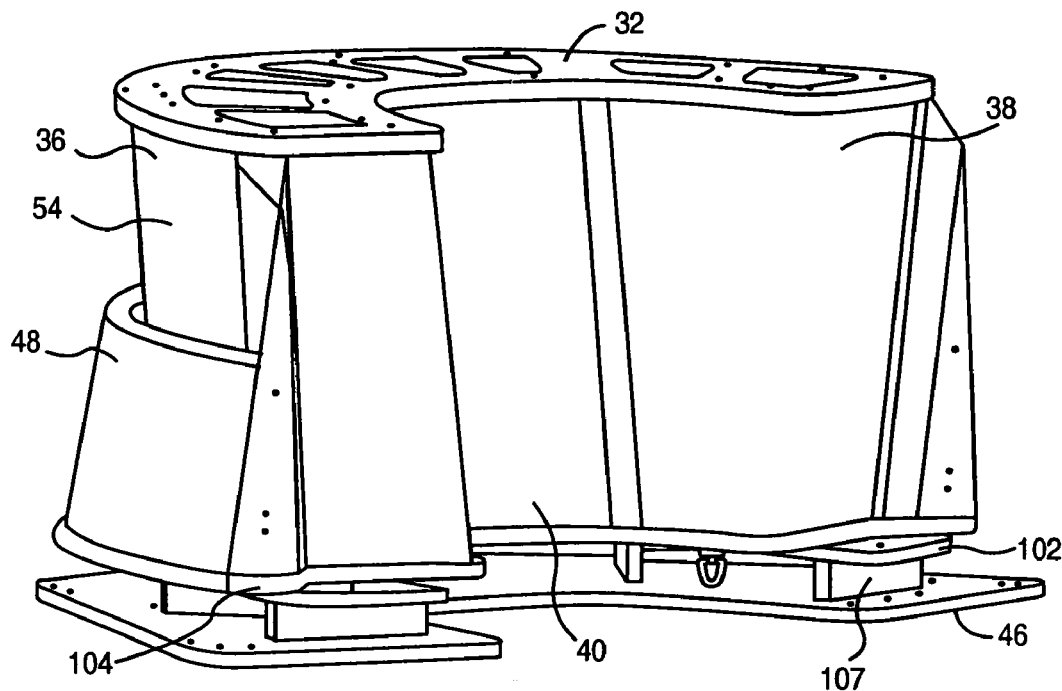
FIG. 6 illustrates a perspective view of the mandrel including the third fairing bar and the cavity section.
Figure 8:
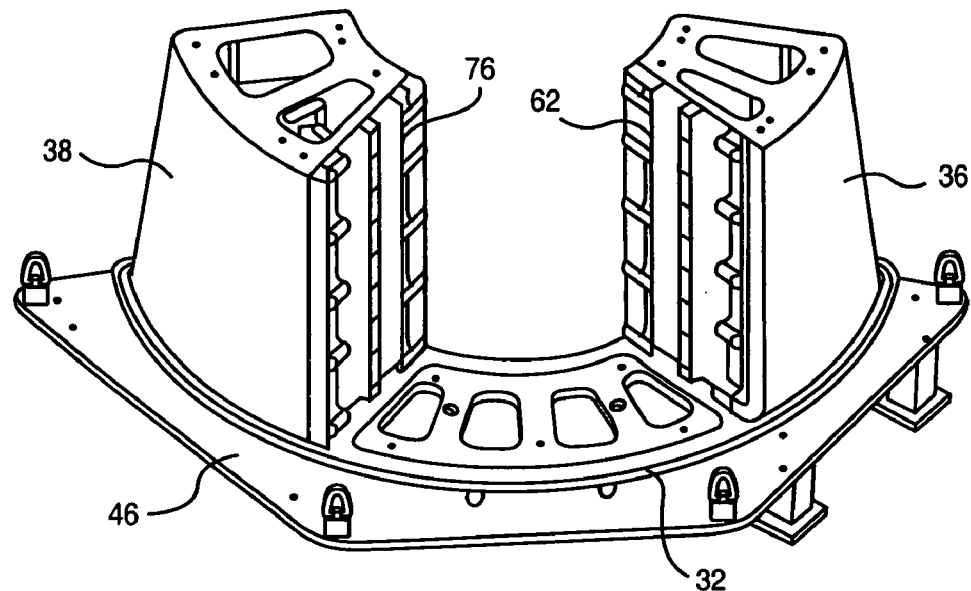
FIG. 8 illustrates the attachment of the second outer section to the first fairing bar.
Figure 9:
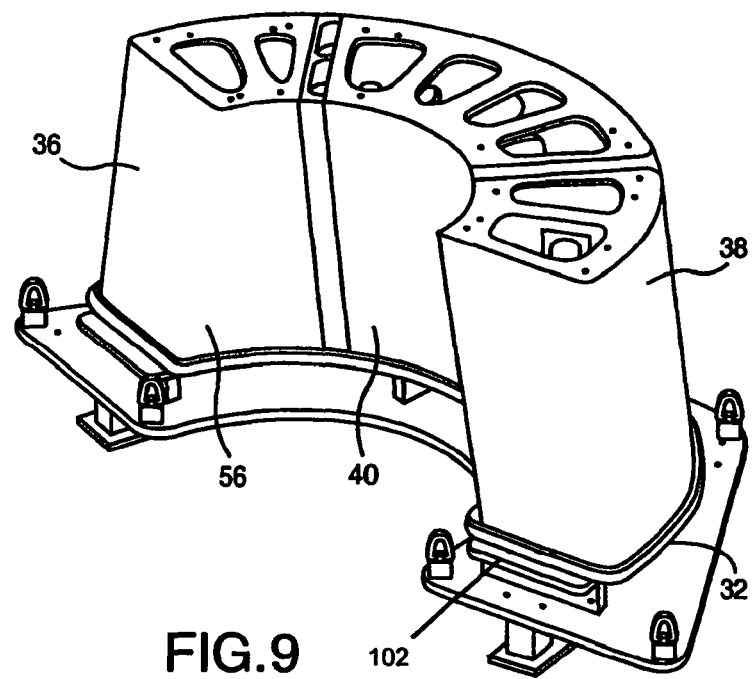
FIG. 9 illustrates the attachment of the center section to the first and second outer sections.

The Mandrel: Referring to FIGS. 1-6, the mandrel is shown generally at 30. It should be noted that the terms mandrel and tool are used interchangeably. The mandrel 30 includes two fairing bars 32, 34, three body sections 36, 38, 40, a nozzle section 42, a ball roller assembly 44, a tilting plate assembly 46 and a cavity section 48.

The first fairing bar 32 has a generally flat, arch shape and includes at least two radially located apertures 50. Similarly, the second fairing bar 34 has a generally flat, arch shape and is positioned parallel to the first fairing bar 32. In one embodiment, the second fairing bar 34 also includes at least two radially located apertures 52.

The three body sections include a first outer section 36, a second outer section 38 and a center section 40. The first outer section 36 has a generally arch-shaped cross section. The sidewalls of the first outer section 36 include an outer wall 54, an inner wall 56, a first sidewall 58 and a second sidewall 60. The second sidewall 60 includes a first female dovetail attachment 62 for engagement with the center section 40.

The outer and inner walls 54, 56 each abut the first sidewall 58 and the second sidewall 60 but do not abut each other. Further, the first outer section 36 has a first end 64 and a second end 66. Both the first and second ends 64, 66 abut the outer wall 54, the inner wall 56, the first sidewall 58 and the second sidewall 60. There is a notched area 67 in the inner wall 56 of the first outer section 36 near the first end 64.

Further, the first outer section 36 has a tapered contour. In other words, the second end 66 has a larger cross sectional area than the first end 64 of the first outer section 36. It can be appreciated, that in general, fan duct contours, to which the mandrel is designed, have an entrance that is larger than the fan duct exit, or nozzle end.

As illustrated in FIG. 1, when the mandrel 30 is assembled, the first outer section 36 is positioned between and attached to the first fairing bar 32 and the second fairing bar 34. The arch shape of the first outer section 36 generally aligns with the arch shape of the first and second fairing bars 32, 34. More specifically, the first end 64 of the first outer section 36 is adjacent to the first fairing bar 32 and the second end 66 is adjacent to the second fairing bar 34.

Similar to the first outer section, the second outer section 38 has a generally arch-shaped cross section. The sidewalls of the second outer section 38 include an outer wall 68, an inner wall 70, a first sidewall 72 and a second sidewall 74. The first sidewall 72 includes a second female dovetail attachment 76 for engagement with the center section 40.

The outer and inner walls 68, 70 each abut the first sidewall 72 and the second sidewall 74 but do not abut each other. Further, the second outer section 38 has a first end 78 and a second end 80. Both the first and second ends 78, 80 abut the outer wall 68, the inner wall 70, the first sidewall 72 and the second sidewall 74. There is a notched area 82 in the inner wall 70 of the center section 40 near the first end 78.

Further, the second outer section 38 has a tapered contour. In other words, the second end 80 has a larger cross sectional area than the first end 78 of the second outer section 38. It can be appreciated, that in general, fan duct contours, to which the mandrel is designed, have an entrance that is larger than the fan duct exit, or nozzle end.

When the mandrel 30 is assembled, the second outer section 38 is positioned between and attached to the first fairing bar 32 and the second fairing bar 34. The arch shape of the second outer section 38 generally aligns with the arch shape of the first and second fairing bars 32, 34. More specifically, the first end 78 of the second outer section 38 is adjacent to the first fairing bar 32 and the second end 80 is adjacent to the second fairing bar 34.

The center section 40 has a generally arch-shaped cross section. The sidewalls of the center section 40 include an outer wall 84, an inner wall 86, a first sidewall 88 and a second sidewall 90. The first sidewall 88 includes a first male dovetail attachment 92 for engagement with the first outer section 36 second sidewall dovetail attachment 62. The center section second sidewall 90 includes a second male dovetail attachment 94 for engagement with the mating dovetail attachment 76 located on the second outer section first sidewall 72.

The center section outer and inner walls 84, 86 each abut the first sidewall 88 and the second sidewall 90 but do not abut each other. Further, the center section 40 has a first end 96 and a second end 98. Both the first and second ends 96, 98 abut the outer wall 84, the inner wall 86, the first sidewall 88 and the second sidewall 90. There is a notched area 100 in the inner wall 86 of the center section 40 near the first end 96.

Further, the center section 40 has a tapered contour. In other words, the second end 98 has a larger cross sectional area than the first end 96 of the center section 40. It can be appreciated, that in general, fan duct contours, to which the mandrel is designed, have an entrance that is larger than the fan duct exit, or nozzle end.

When the mandrel 30 is assembled, the center section 40 is positioned between the first fairing bar 32 and the second fairing bar 34. The arch shape of the center section 40 generally aligns with the arch shape of the first and second fairing bars 32, 34. More specifically, the first end 96 of the center section 40 is adjacent to the first fairing bar 32 and the second end 98 is adjacent to the second fairing bar 34. The first sidewall 88 is attached to the first outer section 36 and the second sidewall 90 is attached to the second outer section 38.

The nozzle section 42 is positioned adjacent to the first outer section notched area 67, the center section notched area 100 and the second outer section notched area 82.

There is a tilting plate assembly 46 to which the first fairing bar 32 is attached. The tilting plate assembly includes a raised plate 102 upon which the first fairing bar 32 is attached and a lower plate 103. The raised plate and the lower plate are connected by spacers 107.

Referring to FIGS. 5 and 10-13, each ball roller assembly 44 includes at least one drive mechanism 45 and multiple ball rollers 47 (see FIG. 11) that work in conjunction during the disassembly process to slide the first and second outer sections toward where the center section had been positioned. The drive mechanism 45 and its associated rollers 47 protrude through the aligned apertures 50 (FIG. 4) in the first fairing bar 32 and the apertures 105 (FIG. 11) in the raised tilting plate 102. Further, the ball roller assemblies 44 are aligned relative to one another such that as each outer section, moving one at a time, rotates off of one ball roller assembly it is picked up by the next ball roller assembly 44.

Figure 10:
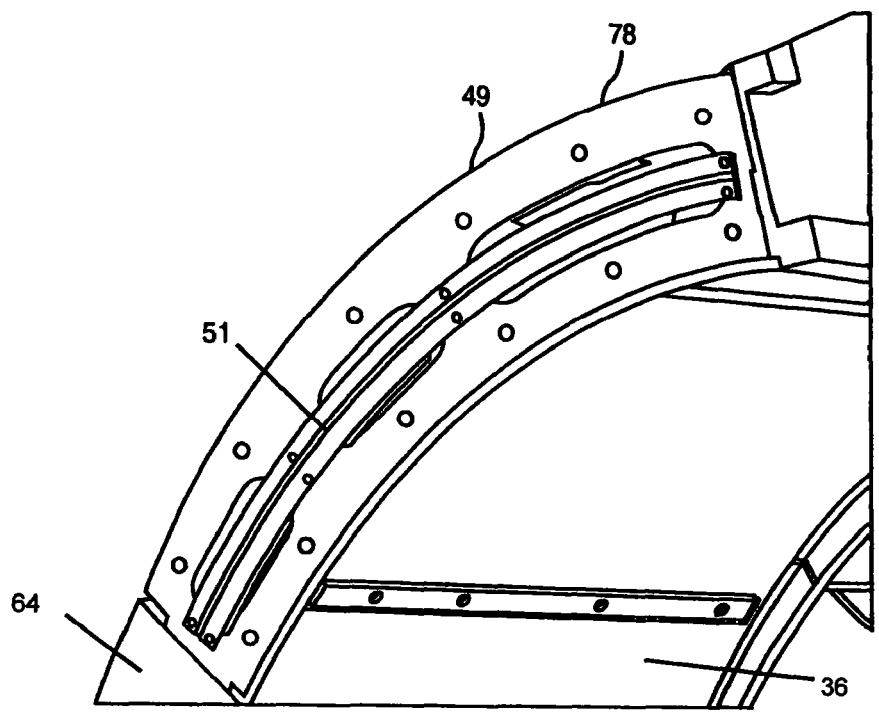
FIG. 10 illustrates the roller ball track plate.

Each outer section first end has a roller ball track plate that engages the ball roller assemblies. FIG. 10 illustrates a roller ball track plate 49. There is one roller ball track plate 49 that is attached to the first outer section first end 64 and there is one roller ball track plate 49 that is attached to the second outer section first end 78.

The plate 49 is generally arch-shaped to fit on the arched cross section of the outer sections of the mandrel. A groove 51 runs along the length of the plate 49. The groove 51 receives the drive mechanism 45 and the ball rollers 47. The plate 49 could be attached to the outer section by a number of different methods including, but not limited to, bolting them together. In an alternative embodiment, the plate 49 is integral with the first end of the outer section.

Figure 11:
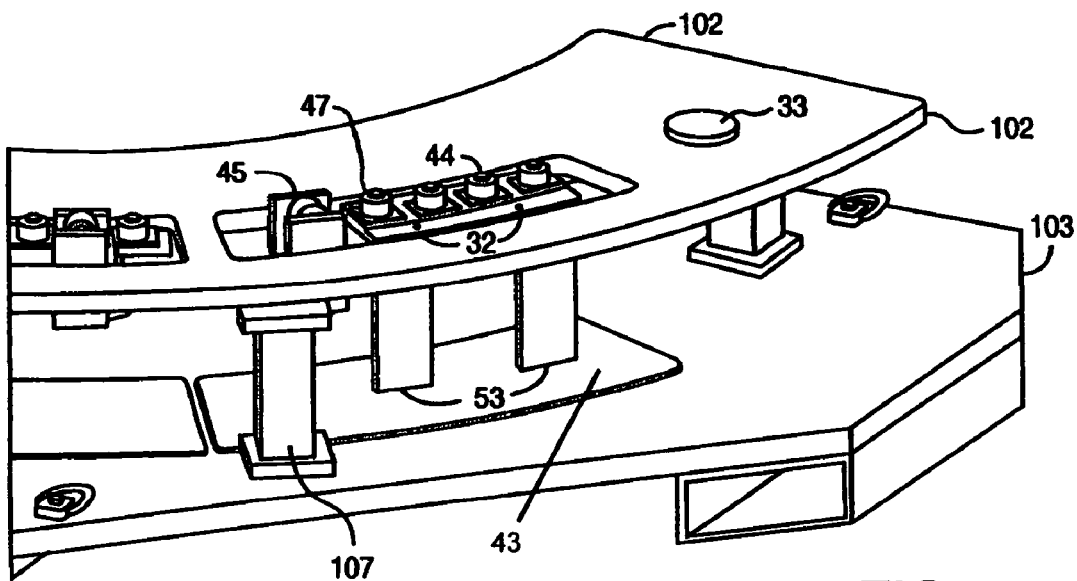
FIG. 11 illustrates a perspective view of the tilting plate assembly.
Figure 12:
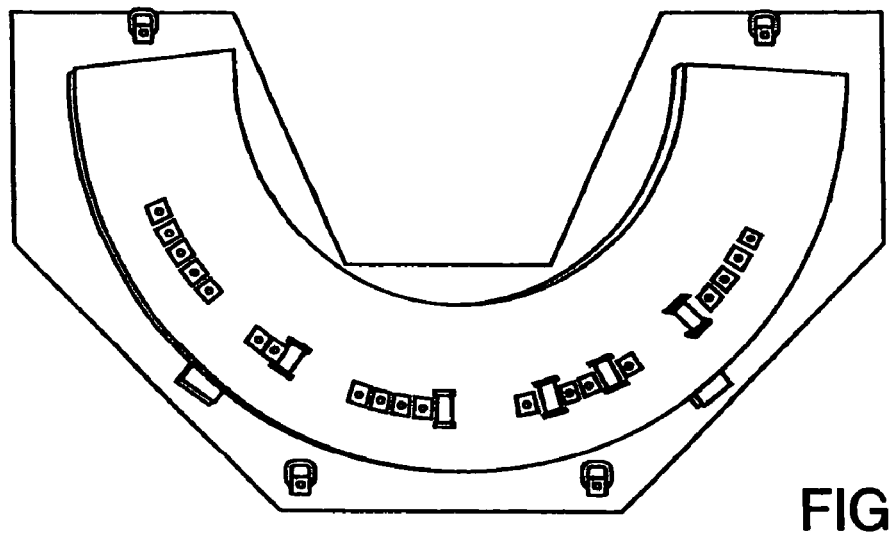
FIG. 12 illustrates a top view of the tilting plate assembly.
Figure 13:
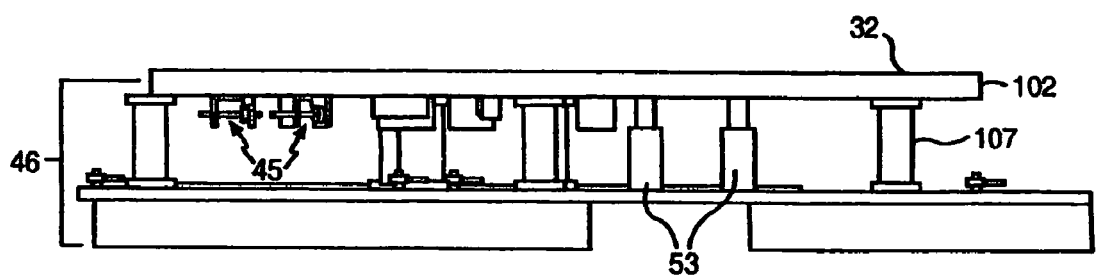
FIG. 13 illustrates a side view of the tilting plate assembly.

Referring to FIGS. 5, 11 and 13, the ball rollers 47 are attached to a platform 43. The platform 43 is attached to at least one hydraulic jack 53 that lifts the ball rollers 47 into their appropriate position within the aligned apertures 105 (FIG. 11) of the raised plate 102 and the apertures 50 (FIG. 4) of the first fairing bar 32. The hydraulic jacks 53 are also attached to the tilting plate assembly lower plate 103. Each drive mechanism 45 is directly attached to the tilting plate assembly raised plate 102.

The mandrel 30 also includes a cavity section 48 that is positioned adjacent to the outer walls 54, 84, 68 of the first outer section, the center section and the second outer section in the assembled mandrel 30. In one embodiment, the cavity section 48 is attached to the second fairing bar 34. In an alternative embodiment, illustrated in FIG. 6, there is a third fairing bar 104 that is wider than the second fairing bar 34 and replaces the second fairing bar 34 during the lay-up procedure of the part. The third fairing bar 104 also includes at least two radially located apertures 106.

The Construction of the Mandrel/Tool: Each of the three body sections is made using the same procedure. First the fabrication of the center section will be described. The preferred material for this type of mandrel is aluminum so as to capture the effect of thermal growth relative to the part materials. This provides a consequent de-molding advantage supplied by this material choice. Additionally, the relative cost and weight of the aluminum material choice, as a function of the features of the apparatus and method disclosed herein, is significantly less than known tooling designs for fan duct applications. It should be appreciated that aluminum is the preferred material for this type of tool mandrel, but other tool materials may be applied.

Figure 15:
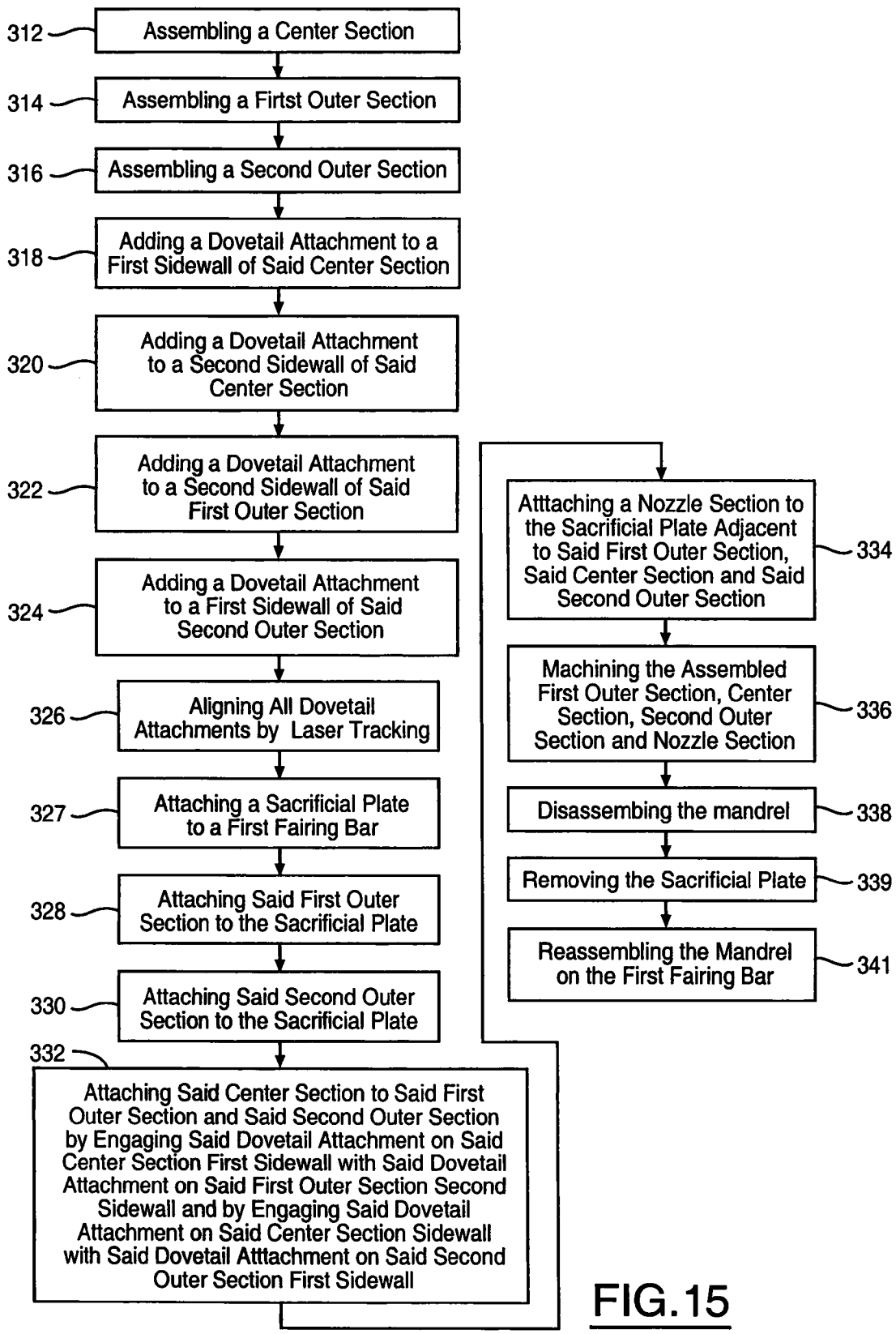
FIG. 15 illustrates the method of constructing a mandrel for fabrication of a monolithic composite nacelle.

FIG. 15 illustrates the method of constructing the mandrel, whereas FIG. 16 illustrates the method of assembling a body section of the mandrel. Referring to FIG. 16, the center section includes a core consisting of a welded egg crate structure, 300. The egg crate is constructed or assembled using interlocking headers and intercostals. The exterior of the egg crate structure is machined to obtain the correct contour on all sides of the mandrel section, 302. More specifically, the outer area of the egg crate is machined. The piece is turned over and the inner area of the egg crate is machined.

Next, a sheet material is stretch formed over a Stretch Form Block, then placed over the egg crate structure and attached to provide a skinned surface, at 304 and 306. FIG. 17 specifically illustrates this method. There is a first sheet of material used for the outer wall and a second sheet of material used for the inner wall. For discussion purposes, the inner wall is attached first, however, it should be noted that either wall could be attached first. The first sheet of material is stretch formed and then welded to the egg crate structure, at 340 and 342. A stretch press pulls and wraps the metal around the Stretch Form Block. The sheet is trimmed to fit the egg crate.

The welding equipment has exposure to the areas that require the weld due to the open nature of the egg crate and having access from the outer wall side where there is no sheet yet attached to the egg crate structure.

The second sheet of material is stretch formed and then welded to the egg crate structure, at 344, 346. In order to weld the second sheet of material that forms the outer wall a slot is milled in the sheet directly over the headers and intercostals for the welding equipment to rosette weld the second sheet to the egg crate structure.

Referring back to FIG. 16, the center section then undergoes an anneal process, illustrated at 308. This process is performed to remove the internal stresses in the component.

After the anneal process, the contour of the center section is rough machined, at 310. This process is then done for both the inner and outer sheets.

The fabrication of all of the body sections, including the center section at 312, first outer section at 314, and the second outer section at 316, are all performed using the same procedure as described for the fabrication of the center section.

Further, referring back to FIG. 15, the seams for each of the three sections are machined specifically by roughing in, then finish machining the dovetail interface surfaces for each section piece, illustrated at 318, 320, 322, 324. The dovetails are aligned and attached to each section via laser tracker, 326. The laser tracker is used to determine that all measurements and placements are precise. The center section has two sides that require the dovetail, whereas the first and second outer sections each require the dovetail on only one side.

All of these steps have been done while the component is positioned in the same shop aid holding fixture. This process is unique to this type of tool to ensure proper indexing of each tool section.

A sacrificial plate is attached to the first fairing bar at 327. The sacrificial plate is added between the first fairing bar and the body sections of the mandrel to prevent the cutter from gouging the fairing bar during finish machining. In other words, the sacrificial plate is capable of accepting machining excess travel. The first outer section is attached to the sacrificial plate at 328. Then the second outer section is attached to the sacrificial plate, 330. The center section is then attached to the first and second outer sections by engaging the dovetail attachment on the center section first sidewall with the dovetail attachment on the first outer section second sidewall and engaging the dovetail attachment on the center second sidewall with the dovetail attachment on the second outer section first sidewall, 332. The nozzle section is attached to the sacrificial plate adjacent to the first outer section, the center section and the second outer section, 334. The assembled first outer section, center section, second outer section, and nozzle section are then fully machined, 336. After the machining, the mandrel is disassembled 338, the plate is removed 339 and the mandrel is reassembled directly on the first fairing bar 341.

Assembly of the Mandrel: FIG. 18 illustrates the method of assembling the mandrel 30. The tilting plate is first positioned on the floor. The first fairing bar is attached to the tilting plate, at 350. This attachment may occur by bolting the first fairing bar to the tilting plate. The first fairing bar includes the removable ball roller assembly and drive mechanism used for demolding assistance. The ball roller assembly includes rubber wheels that are in friction contact with the section pieces to assist with the disassembly process. Specifically, at disassembly the roller assembly and drive mechanism allow the outer sections to swing around an arc shaped path to allow the sections to be removed from the interior of the completed part.

The first outer section is then attached to the first fairing bar, at 352. The first fairing bar includes locating pins. There are at least two locating pins 33 for each of the outer sections of the mandrel. The locating pins 33 are aligned with and receive locating apertures that are on each of the outer sections. Once located, the first outer section is bolted to the first fairing bar.

The second outer section is also attached to the first fairing bar, at 354. First the second outer section is located by aligning its locating apertures with the locating pins on the first fairing bar. Once in the proper position, the second outer section and the first fairing bar are bolted together. It should be noted that the order in which the first and second outer sections are attached to the first fairing bar does not matter. In other words, the second outer section could be attached to the first fairing bar first and the first outer section attached to the first fairing bar second.

Figure 14:
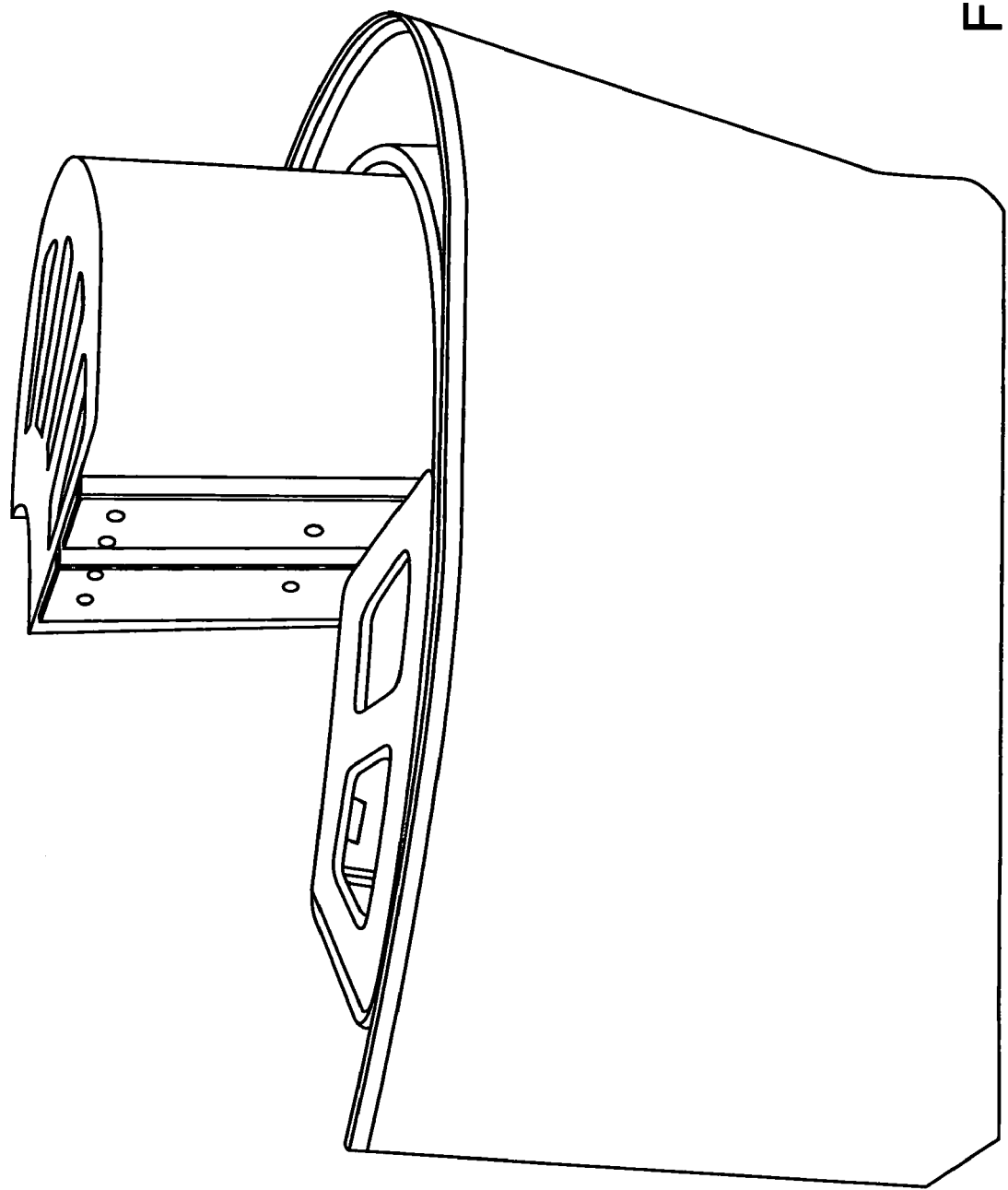
FIG. 14 illustrates the mandrel coming out of the part.

The center section is then locked into its proper position by engaging the interlocking, tapered dovetails between the three sections, at 356. The center section is lowered from above between the first outer section and the second outer section, as illustrated in FIG. 14. The first dovetail on the center section engages the first outer section dovetail and the second dovetail on the center section engages the second outer section dovetail. The dovetail geometry is specifically designed to be double tapered, transitioning to parallel features engaging in the last one-inch of travel, so as to create free travel, and final, positive engagement.

The three sections lock together during the last one-inch of vertical travel of the center section. All three sections lock together via the precise matching of the dovetails as described above. The three sections are each tapered and the inherent shape of the dovetail is tapered. Due to this geometry, the three sections pull together and lock into the correct position relative to each other. Also, the tapered geometry allows for clearance in the disassembly stage.

Each section of the mandrel is individually bolted to the first fairing bar, but there is no need to bolt the sections together. Therefore, even though the sections are locked together via the dovetail attachment, this attachment is not strong enough to support its own weight. However, once the sections are bolted to the fairing bar the mandrel is sturdy enough to be maneuvered and not fall apart.

Next, the nozzle section is attached to the first fairing bar, at 358. In one embodiment, the nozzle section is bolted to the first fairing bar. In another embodiment, the nozzle section is integral to or permanently attached to the first fairing bar. In the embodiment where the nozzle section is a separate component, the nozzle section is positioned adjacent to the inner wall of the first outer section, the inner wall of the center section and the inner wall of the second outer section.

The second fairing bar is attached to the three sections of the mandrel, at 360. When completely assembled there is no need for vacuum tight seals between the first outer section, the center section and the second outer section, or anywhere along the length of the dovetail interface. This is a key feature for a multi-piece tool that differentiates from prior art multi-piece tooling. Vacuum integrity is achieved by seals 35 designed into the end of each fairing bar assembly, as illustrated in FIG. 5. The seal locations in the end fairing bars surround end openings used for weld access, in each end of the center and outer section pieces. Location is preserved using indexing features common to both the fairing bar end pieces and the segmented mandrel pieces. Vacuum ports located in the end fairing bars allow for air to be evacuated from the part. The fairing bar shape and geometry, in addition to lending structural integrity and deflection resistance, also assists in the creation of the vacuum bag for part cure, allowing the bag to be built spanning from one end fairing bar to the other.

At this point, the mandrel is in condition to begin the lay-up procedure for the part. The part fabricated with the aid of the mandrel is fabricated in multiple stages. As a result, there is a first mandrel used and a second mandrel used in the lay-up process. During the lay-up of the nacelle, once the cavity section is attached to the third fairing bar, shown at 362, it is referred to as the second mandrel.

FIG. 19 illustrates the method of dissembling the first mandrel. This stage of the process is executed by standing the entire assemblage on the tilting plate so that it is in a vertical position, at 406. The second fairing bar is unbolted and removed, at 408. Then the center section of the mandrel is disengaged by being lifted from above and pulled out from between the first outer section and the second outer section, at 410. This is also illustrated in FIG. 14.

Then the first outer section is rotated on the ball roller assembly and travels in an arc shaped path to provide clearance so that it can be lifted out from the center of the fan duct part, at 412 and 414. Once the first outer section is removed, the second outer section is also rotated on the ball roller assembly about an arc shaped path so that it can be lifted out from the center of the fan duct part, at 416 and 418. It is important to note that there is no particular order required for removal of the first and second outer sections.

The first stage of the part can be removed from the first fairing bar-after removing all three sections of the mandrel. Next, the second stage of the part will be fabricated. Due to the taper in the shape of the part, the tool must be slipped inside of the part rather than the part slipped over the tool.

FIG. 20 illustrates the method of assembling the second-mandrel. The second fairing bar is replaced with a third fairing bar, at 424. However, it should be noted that in one embodiment the second fairing bar could be reused at this stage if it is large enough to accommodate the cavity section. This third fairing bar is larger than the second fairing bar to accommodate attachment of a cavity section. The first fairing bar is attached to the tilting plate.

The first stage of the fan duct part is then positioned on the first fairing bar, at 430. The nozzle section is attached to the first fairing bar, at 432. The first and second outer sections are separately lowered down into position within the fan duct part. Each is rotated about an arc shaped path defined by the ball roller assembly into its final position, as shown at 434, 436, 440, and 442. There is no particular order in which the first and second outer sections are put into their positions. Once located into their appropriate positions, the first and second outer sections are attached to the first fairing bar, at 438, 444.

The center section is lowered into its proper position by engaging the dovetails of the first and second outer sections, at 446. The three sections of the mandrel lock into place during the last one-inch of vertical travel of the center section.

The second or third fairing bar, whichever is being used as part of the second mandrel, is attached to the assembled mandrel, at 448. As illustrated in FIG. 18 and previously discussed, the cavity section is attached to the third fairing bar, at 362.

Bagging plugs are installed at strategically located positions. The bagging plugs help to make a smooth transition and fair the bag so that the bag won't break during part cure.

Figure 21:
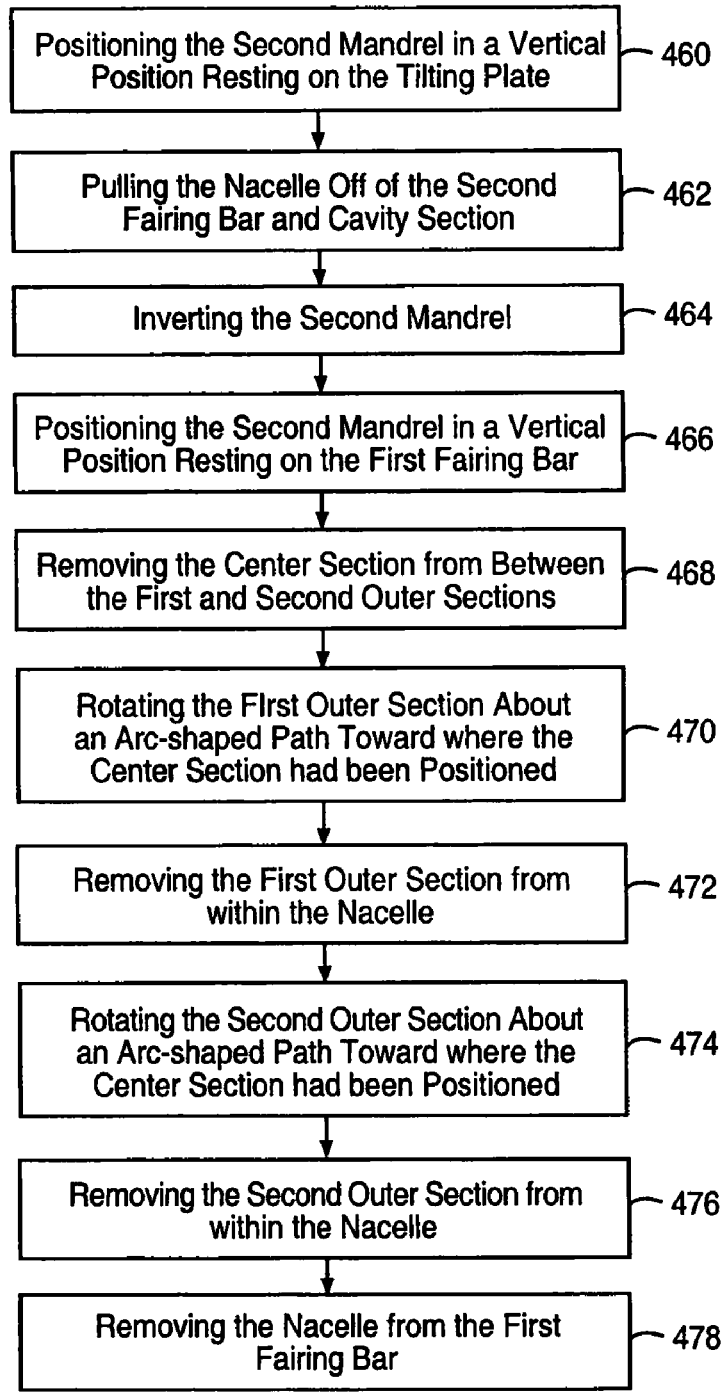
FIG. 21 illustrates the method of disassembling the second mandrel.

Final Disassembly: FIG. 21 illustrates the method of disassembling the second mandrel. The first fairing bar is removed from the tilting plate and the second mandrel is inverted. Then, the second mandrel is placed in a vertical position with the third fairing bar down resting on the tilting plate, at 460. The final air duct part is pulled off of the cavity section, at 462. The component is inverted again and the tool disassembly begins, at 464. The second mandrel is placed in a vertical position resting on the first fairing bar, at 466. Then, the center section of the mandrel is removed from its position within the part, at 468. Then each outer section is individually removed from its position within the part. The first outer section is rotated about an arc shaped path as defined by the ball roller assembly and drive mechanism, at 470. The first outer section is then pulled out vertically from within the part, at 472. Similarly, the second outer section is rotated about the arc shaped path as defined by the ball roller assembly and drive mechanism, at 474. Then the second outer section is pulled out vertically from within the part, at 476.

Once the three sections of the mandrel are removed the fan duct part or nacelle can be removed from the first fairing bar, thus completing assembly of the fan duct part, as illustrated at 478.

While the apparatus and method have been described in what is presently considered to be its most practical and preferred embodiment or implementation, it is to be understood that the apparatus and method are not to be limited to the disclosed embodiment. On the contrary, the disclosed embodiments are intended to cover various modifications and equivalent arrangements included within the spirit and scope of the appended claims, which scope is to be accorded the broadest interpretation so as to encompass all such modifications and equivalent structures as is permitted under the law.

We claim:

1. A method of constructing a mandrel for fabrication of a monolithic composite nacelle comprising the steps of:
    fabricating a first outer section, a center section and a second outer section of the mandrel by forming an egg crate structure by welding together egg crate sections; machining said egg crate structure to a desired contour; stretch forming a metallic skin over said egg crate structure; attaching said metallic skin to said egg crate structure by welding; subjecting the egg crate structure to an anneal process; and machining the exterior surface of the metallic skin to the proper contour;
    assembling the center section between the first outer section and the second outer section;
    attaching a nozzle section adjacent to the first outer section, the center section and the second outer section; and
    machining the first outer section, center section, second outer section and nozzle section to form the mandrel.

2. The method of claim 1, wherein the center section is assembled between the first outer section and the second outer section by attaching the first outer section and the second outer section to a sacrificial plate, and attaching the center section to the first section and the outer section.

3. The method of claim 2, further comprising the steps of:
    disassembling the first outer section, the center section and the second outer section from the sacrificial plate; and
    reassembling the first outer section, the center section and the second outer section on a first fairing bar.

4. The method of claim 2, wherein the nozzle section is attached to the sacrificial plate.

5. The method of claim 1, wherein the first outer section, the center section and the second outer section are assembled on a sacrificial plate.

6. The method of claim 5, further comprising the steps of:
    disassembling the first outer section, the center section and the second outer section from the sacrificial plate; and
    reassembling the first outer section, the center section and the second outer section on a first fairing bar.

7. A method of constructing a mandrel for fabrication of a monolithic composite nacelle comprising the steps of:
    attaching a sacrificial plate to a first fairing bar including an exposed ball roller assembly;
    attaching the first fairing bar to a tilting plate;
    attaching a first outer section and a second outer section of the mandrel to the sacrificial plate;
    attaching a center section of the mandrel to said first outer section and said second outer section;
    attaching a nozzle section adjacent to said first outer section, said center section, and said second outer section;
    machining the first outer section, center section, second outer section, and nozzle section to form the mandrel;
    disassembling the first outer section, the center section and the second outer section from the sacrificial plate;
    removing the sacrificial plate from the first fairing bar; and
    reassembling the first outer section, the center section and second outer section to form the mandrel on the first fairing bar.

8. The method of claim 7 further comprising fabricating the first outer section, the center section and the second outer section by: forming an egg crate structure by welding together egg crate sections; machining said egg crate structure to a desired contour; stretch forming a metallic skin over said egg crate structure; attaching said metallic skin to said egg crate structure by welding; subjecting the egg crate structure to an anneal process; and machining the exterior surface of the metallic skin to the proper contour.

9. The method of claim 8 wherein stretch forming a metallic skin over said egg crate structure includes the steps of: stretch forming a metallic sheet over a stretch form block representing a inner wall that is defined by the egg crate structure; welding said inner wall to said egg crate structure; stretch forming a metallic sheet over a stretch form block representing an outer wall that is defined by the egg crate structure; and welding said outer wall to said egg crate structure.

10. The method of claim 7, further comprising attaching a second fairing bar to said first outer section, said center section and said second outer section, wherein the said first fairing bar is attached to a first side of the first outer section, the second outer section and the center section, and the second fairing bar is attached to a second side opposite the first side of the first outer section, the second outer section and the center section.

11. The method of claim 10, further comprising the steps of:
positioning the mandrel in an upright position resting on the tilting plate;
removing the second fairing bar;
removing the center section from between the first outer section and the second outer section;
rotating the first outer section about an arc-shaped path on the ball roller assembly toward where the center section had been positioned;
removing the first outer section;
rotating the second outer section on the ball roller assembly about an arc shaped path toward where the center section had been positioned;
removing the second outer section;
disassembling the first fairing bar from the tilting plate.

12. The method of claim 7, wherein a first dovetail attachment is provided on a first sidewall of the center section and a second dovetail attachment is provided on a second sidewall of the center section, a third dovetail attachment is provided on a second sidewall of the first outer section, and a fourth dovetail attachment is provided on a first sidewall of said second outer section, the method further comprising attaching said center section to said first outer section and said second outer section by engaging said first dovetail attachment with said third dovetail attachment and by engaging said second dovetail attachment with said fourth dovetail attachment.

13. The method of claim 12 wherein the first dovetail attachment, the second dovetail attachment, the third dovetail attachment and the fourth dovetail attachment are aligned on the center section, the first outer section and the second outer section by laser tracking.

14. The method of claim 7 wherein said first fairing bar is bolted to said tilting plate.

15. The method of claim 7 wherein said ball roller assembly is bolted to said first fairing bar.

16. The method of claim 7 wherein said first outer section and said second outer section are bolted to said first fairing bar.

17. The method of claim 7 further comprising attaching the nozzle section to said first fairing bar such that the nozzle section is positioned adjacent an inner wall of said first outer section, an inner wall of said center section, and an inner wall of said second outer section.

* * * * *